(12) United States Patent
Yamagishi et al.

(10) Patent No.: US 8,573,779 B2
(45) Date of Patent: Nov. 5, 2013

(54) LIGHTING DEVICE WITH PLURAL LIGHT SOURCES ILLUMINATING DISTINCT REGIONS OF INTEGRATOR

(75) Inventors: Shigekazu Yamagishi, Osaka (JP); Hiroshi Kitano, Hyogo (JP); Yoshimasa Fushimi, Osaka (JP); Takaaki Tanaka, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 372 days.

(21) Appl. No.: 13/037,384

(22) Filed: Mar. 1, 2011

(65) Prior Publication Data
US 2011/0234923 A1  Sep. 29, 2011

(30) Foreign Application Priority Data
Mar. 26, 2010  (JP) ................... 2010-071996

(51) Int. Cl.
*G03B 21/00* (2006.01)
*G03B 21/28* (2006.01)
*G02B 6/32* (2006.01)
*G02B 6/34* (2006.01)

(52) U.S. Cl.
USPC ............ 353/33; 353/81; 385/34; 385/36

(58) Field of Classification Search
USPC ........... 353/31, 33, 81, 85, 94, 98–99, 38; 385/33–34, 36
See application file for complete search history.

(56) References Cited

U.S. PATENT DOCUMENTS

| | | | |
|---|---|---|---|
| 6,505,939 B1 * | 1/2003 | Bierhuizen et al. | 353/94 |
| 6,561,654 B2 * | 5/2003 | Mukawa et al. | 353/31 |
| 7,182,468 B1 * | 2/2007 | Haven | 353/94 |
| 7,530,697 B2 * | 5/2009 | Sawai et al. | 353/94 |
| 8,016,425 B2 * | 9/2011 | Ito | 353/31 |
| 2006/0007406 A1 * | 1/2006 | Adkins et al. | 353/82 |
| 2006/0221310 A1 * | 10/2006 | Kim et al. | 353/99 |
| 2006/0227293 A1 * | 10/2006 | Kasazumi et al. | 353/30 |
| 2006/0244929 A1 * | 11/2006 | Sawai et al. | 353/84 |
| 2007/0121084 A1 * | 5/2007 | Chang | 353/94 |
| 2008/0239248 A1 * | 10/2008 | Mihara et al. | 353/85 |
| 2010/0149496 A1 * | 6/2010 | Inoue | 353/98 |
| 2010/0309439 A1 * | 12/2010 | Bi et al. | 353/33 |

FOREIGN PATENT DOCUMENTS

| | | | |
|---|---|---|---|
| JP | 2006-039338 A | 2/2006 | |
| JP | 2009-259583 A | 11/2009 | |

* cited by examiner

*Primary Examiner* — Tony Ko
*Assistant Examiner* — Jori S Reilly-Diakun
(74) *Attorney, Agent, or Firm* — Judge Patent Associates

(57) ABSTRACT

A lighting device is provided which efficiently achieves a high brightness and a high image quality by using a solid light source which has long service life and does not need mercury. The lighting device includes a first light source section, a second light source section, a second rod integrator for combining lights emitted from the first and second light source sections, and a first rod integrator for guiding the light from the first light source section, to the second rod integrator. On an incident surface of the second rod integrator, a first region on which the light emitted from the first light source section is incident and a second region on which the light emitted from the second light source section is incident do not overlap each other, and the surface area of the first region and the surface area of the second region are different from each other.

13 Claims, 13 Drawing Sheets

LIGHTING DEVICE WITH PLURAL LIGHT SOURCES ILLUMINATING DISTINCT REGIONS OF INTEGRATOR

CROSS-REFERENCE TO RELATED APPLICATION

The disclosure of Japanese Patent Application No. 2010-071996, filed on Mar. 26, 2010, is incorporated herein by reference.

BACKGROUND OF THE INVENTION

1. Field of the Invention

The present invention relates to lighting devices that efficiently combine a plurality of light sources and that combine lights from different types of light sources, thereby allowing an image quality to be improved. Further, the present invention relates to projection type image display apparatuses using the lighting devices.

2. Description of the Background Art

In recent years, LEDs have been used as light sources for generic illumination, since they have long service life and high light-emission efficacy. The use of LEDs as light sources for projection type image display apparatuses is under consideration, since, for example, LEDs have long service life, do not include mercury, and do not rupture. However, LEDs have a broad light-emitting surface area and poor light-converging efficiency, and therefore, as light sources for projection type image display apparatuses in which light must be converged on an image display element that is a small-scale unit, at present, LEDs have not been used for projection type image display apparatuses other than ultra-compact apparatuses which cause no problems even when output of light is low.

Therefore, methods for increasing output of light, such as by using and combining a plurality of LED light sources, or combining LED light sources and another light sources, have been proposed. For example, as shown in FIG. 13, in Japanese Laid-Open Patent Publication No. 2006-39338, a large number of LEDs 1311 are arranged and optically combined, thereby improving light output.

Further, as shown in FIG. 14, in Japanese Laid-Open Patent Publication No. 2009-259583, a fluorescent material 1411 that allows green light to pass therethrough and that wavelength-converts blue light into green light, is disposed on an optical path for a green LED. As an excitation source for the fluorescent material, a laser beam is used. Since a laser element allows light to be converged on a small surface area even when output is increased, a point light source having high output can be formed. As a result, green light brightness is increased, and improvement of light output of an output image is achieved.

Here, etendue is used as a definition of light which allows for optical handling. When it is assumed that there are no limitations on optical parts in a projection type image display apparatus, among light emitted from a light source, light for the same etendue as the etendue of a liquid crystal panel or DMD used as an image display element, can be handled. The etendue is defined as follows:

$$\text{etendue} = \pi \times A \times (\sin\theta)^2 \qquad (1),$$

wherein

A denotes the surface area of a portion at which light is handled, and

θ denotes a converging angle relative to the portion A, or a light-emitting angle.

SUMMARY OF THE INVENTION

In the invention described in Japanese Laid-Open Patent Publication No. 2006-39338, regarding the etendue of a light source, the sum of the surface areas of the LED light-emitting parts (emitters) is considered as a light source surface area A. Thus, even though the amount of light is increased by providing a large number of LEDs, the etendue also increases in proportion to the increased amount of light. Therefore, for introducing light emitted from such a light source, an image display apparatus having a high etendue, namely, an image display apparatus that can handle light incident on a large surface area or at a high angle, is required. This results in an increase in the size and cost of the image display apparatus, and the image display apparatus becomes very expensive.

In the invention described in Japanese Laid-Open Patent Publication No. 2009-259583, as shown in FIG. 14, red light, blue light, and green light all pass through a converging lens located at an upper right position in FIG. 14, and enters an image display apparatus. Thus, the etendue depends at least on LEDs used for red light, blue light, and green light, respectively. Meanwhile, there is the fluorescent material 1411 on the optical path of green light, and the fluorescent material 1411 is excited by a blue laser beam to emit green light. Further, the light-emission efficacy of the fluorescent material 1411 is low only with the green light emitted from the LED, and thus most part of the green light emitted from the fluorescent material 1411 is fluorescent light generated by the excitation caused by the blue laser beam. However, the green fluorescent light has spectral characteristics in which a spectral distribution extends over a wide wavelength range as compared to that of the green LED light. Specifically, the peak wavelength of the spectral distribution is located to the long wavelength side of the peak wavelength of ideal green light, and the spectral distribution includes wavelengths of blue light. As a result, the color purity of green color is decreased, and it is difficult to obtain a high-quality video image.

Therefore, an object of the present invention is to provide: a lighting device that efficiently achieves a high brightness and a high image quality by using a solid light source that has long service life and does not need mercury; and a projection type image display apparatus using the lighting source.

A lighting device according to the present invention includes a first light source section, a second light source section, and a light combining section for combining light emitted from the first light source section and light emitted from the second light source section. On an incident surface of the light combining section, a first region on which the light emitted from the first light source section is incident and a second region on which the light emitted from the second light source section is incident do not overlap each other, and the surface area of the first region and the surface area of the second region are different from each other.

Further, a projection type image display apparatus according to the present invention includes: the above lighting device; an image display element on which light emitted from the lighting device is incident and that modulates the incident light in accordance with a video signal; and a projection lens for projecting onto a screen the light modulated by the image display element.

According to the present invention, a lighting device can be achieved which can most efficiently obtain a high brightness and a high image quality by using a solid light source that has long service life and does not need mercury. In addition, a projection type image display apparatus using the lighting device can be provided.

DESCRIPTION OF THE PREFERRED EMBODIMENTS

First Embodiment

Figure 1:
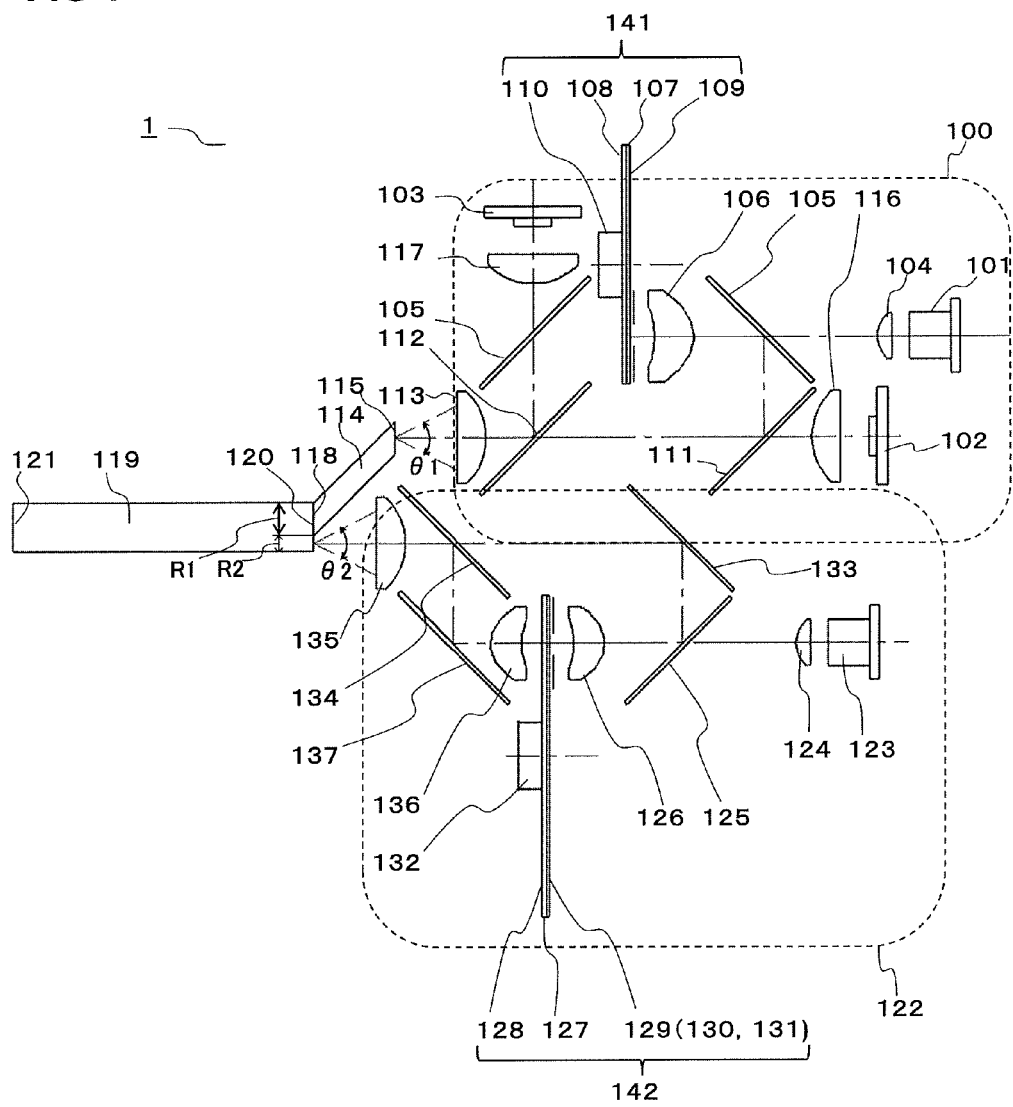
FIG. 1 is a configuration diagram of a lighting device according to a first embodiment.

FIG. 1 is a configuration diagram of a lighting device according to a first embodiment.

The lighting device 1 combines lights emitted from a plurality of light sources and performs uniform illumination with a high brightness. The lighting device 1 includes a first light source section 100, a second light source section 122, a first rod integrator 114, and a second rod integrator 119.

The first light source section 100 includes a laser element 101 emitting blue light, an LED 102 emitting green light, an LED 103 emitting blue light, collimator lenses 104, 106, and 116, red reflection dichroic mirrors 105 and 111, a blue reflection dichroic mirror 112, a rotation plate 141, a motor 110 rotating the rotation plate 141, and a converging lens 113. The rotation plate 141 includes: a disc-shaped base plate 108 formed from glass; a blue transmission dichroic mirror coat 107 applied to one surface of the base plate 108 (a surface thereof on the side opposite to the second rod integrator 119); and a fluorescent material 109 that is provided on the blue transmission dichroic mirror coat 107 and that has fluorescence to emit red light upon receiving blue excitation light.

The blue light emitted from the laser element 101 is converted into a very thin parallel light beam by the collimator lens 104 and passes through the red reflection dichroic mirror 105 and the collimator lens 106. The passed blue laser beam is applied to the fluorescent material 109 of the rotation plate 141. Thus, the fluorescent material 109 is excited to emit red fluorescent light. The rotation plate 141 is rotated by the motor 110 provided at the center thereof. The red fluorescent light emitted from the fluorescent material 109 (including light reflected by the blue transmission dichroic mirror coat 107 on the back surface of the fluorescent material 109) is emitted at a high divergence angle. The collimator lens 106 is designed such that a focal point thereof is located on the surface of the fluorescent material 109, and thus the red fluorescent light is converted into substantially parallel light by passing through the collimator lens 106. The red fluorescent light having been converted into the parallel light is reflected by the red reflection dichroic mirrors 105 and 111, and then passes through the blue reflection dichroic mirror 112. The passed red fluorescent light is converged on an incident surface 115 of the first rod integrator 114 by the converging lens 113. In addition, the green light emitted from the LED 102 is converted into substantially parallel light by the collimator lens 116 of which a focal point is located on a light-emitting surface of the LED 102. The green light having been converted into the parallel light passes through the red reflection dichroic mirror 111, and then passes through the blue reflection dichroic mirror 112, similarly to the red light. The passed green light is converged on the incident surface 115 of the first rod integrator 114 by the converging lens 113. Moreover, the blue light emitted from the LED 103 is converted into substantially parallel light by the collimator lens 117 of which a focal point is located on a light-emitting surface of the LED 103. The blue light having been converted into the parallel light is reflected by the blue reflection dichroic mirror 112, and then converged on the incident surface 115 of the first rod integrator 114 by the converging lens 113.

The second light source section 122 includes a laser element 123 emitting blue light, collimator lenses 124, 126, and 136, a blue transmission dichroic mirror 125, a blue reflection dichroic mirror 134, total reflection mirrors 133 and 137, a rotation plate 142, a motor 132 rotating the rotation plate 142, and a converging lens 135. The rotation plate 142 includes a base plate 128; a blue transmission dichroic mirror coat 127 applied to one surface of the base plate 128 (a surface thereof on the side opposite to the second rod integrator 119); a fluorescent material 129 that has fluorescence to emit red light upon receiving blue excitation light; a fluorescent material 130 that is excited to emit green light when being irradiated with a blue laser beam; and a light-transmitting part 131 having a light-diffusing function.

Figure 2:
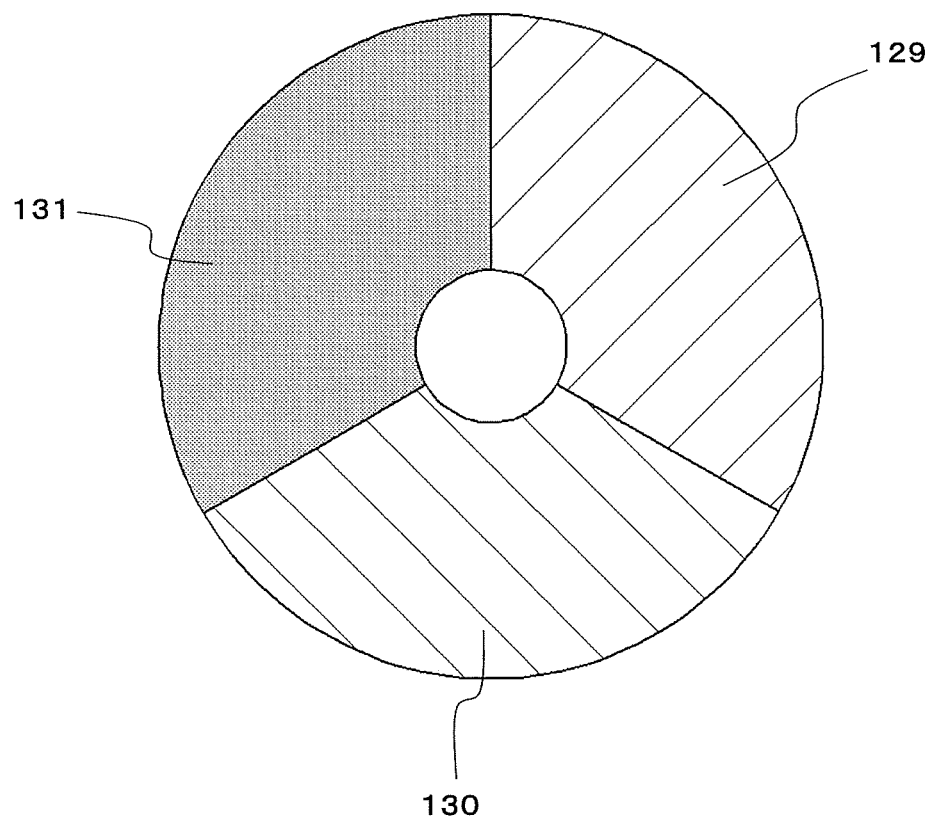
FIG. 2 is a schematic diagram for explaining a rotation plate of the lighting device shown in FIG. 1.

FIG. 2 is a schematic diagram for explaining the rotation plate of the lighting device shown in FIG. 1.

The fluorescent material 129, the fluorescent material 130, and the light-transmitting part 131 are provided on circumferentially equally divided portions, respectively, of the blue transmission dichroic mirror coat 127 of the rotation plate 142.

Referring back to FIG. 1, the blue laser beam emitted from the laser element 123 is converted into a very thin parallel light beam by the collimator lens 124 and passes through the blue transmission dichroic mirror 125 and the collimator lens 126, and then enters the rotation plate 142. The rotation plate 142 is rotated by the motor 132 provided at the center thereof. Thus, the fluorescent material 129, the fluorescent material 130, and the light-transmitting part 131 are repeatedly irradiated in order with the blue laser beam. When the fluorescent material 129 is irradiated with the blue laser beam, red fluorescent light is emitted. The red fluorescent light (including light reflected by the blue transmission dichroic mirror coat 127) is emitted at a high divergence angle. The collimator lens 126 is designed such that a focal point thereof is located on the surface of the fluorescent material 129 or 130, and thus the red fluorescent light is converted into substantially parallel light by passing through the collimator lens 126. The red fluorescent light having been converted into the parallel light is reflected in order by the blue transmission dichroic mirror 125 and the total reflection mirror 133, and then passes through the blue reflection dichroic mirror 134. The passed red fluorescent light is converged on an incident surface 120 of the second rod integrator 119 by the converging lens 135. In addition, when the fluorescent material 130 is irradiated with the blue laser beam, green fluorescent light is emitted. The green fluorescent light (including light reflected by the blue transmission dichroic mirror coat 127) is emitted at a high divergence angle. The green fluorescent light is converted into parallel light by the collimator lens 126. The green light having been converted into the parallel light is reflected in order by the blue transmission dichroic mirror 125 and the total reflection mirror 133, and then passes through the blue reflection dichroic mirror 134. The passed green fluorescent light is converged on the incident surface 120 of the second rod integrator 119 by the converging lens 135. Moreover, when the blue laser beam passes through the light-transmitting part 131, the blue laser beam is diffused. The collimator lens 136 is designed such that a focal point thereof is located on the surface of the light-transmitting part 131, and thus the diffused blue light is converted into substantially parallel light by passing through the collimator lens 136. The blue light having been converted into the parallel light is reflected in order by the total reflection mirror 137 and the blue reflection dichroic mirror 134, and then converged on the incident surface 120 of the second rod integrator 119 by the converging lens 135. Note that by causing a timing of the first light source section 100 emitting each of red light, green light, and blue light to coincide with a timing of the second light source section 122 emitting each of red light, green light, and blue light, it is also possible to sequentially emit light of each color from the second rod integrator 119.

The first rod integrator 114 guides light emitted from the first light source section 100, to the second rod integrator 119. The light emitted from the first light source section 100 is incident on the incident surface 115 of the first rod integrator 114, and then propagated in the first rod integrator 114 while being repeatedly totally reflected inside the first rod integrator 114. The first rod integrator 114 is a rectangular-columnar optical element that is formed from glass, and the incident surface 115 and an exit surface 118 thereof are inclined relative to its central axis, longitudinally.

The second rod integrator 119 is a rectangular-columnar optical element that is formed from glass, and combines the light emitted from the first light source section 100 and light emitted from the second light source section 122. Specifically, the exit surface 118 of the first rod integrator 114 is in contact with a part of the incident surface 120 of the second rod integrator 119 or may face the part of the incident surface 120 of the second rod integrator 119 at a very short interval. The light from the first light source section 100 is incident on a first region R1, of the incident surface 120 of the second rod integrator 119, which is in contact with the exit surface 118 of the first rod integrator 114. Meanwhile, the light from the second light source section 122 is directly incident on a second region R2 that is a part of the incident surface 120 of the second rod integrator 119 excluding the first region R1. The first region R1 and the second region R2 do not overlap each other, and have different surface areas. Light incident on the incident surface 120 in an oblique direction is repeatedly totally reflected inside the second rod integrator 119. Lights having various incident angles are propagated while being repeatedly totally reflected, whereby the lights are combined, and light having a uniform intensity distribution is emitted from an exit surface 121 of the second rod integrator 119.

Since the exit surface 118 is inclined relative to the central axis of the first rod integrator 114 as described above, when the exit surface 118 is in contact with the incident surface 120, the central axis of the first rod integrator 114 is inclined relative to the incident surface 120 of the second rod integrator 119. By so doing, the incident surface 115 and the exit surface 118 are located at positions that are different in the vertical direction in FIG. 1 from each other. Thus, a space is formed to the second light source section 122 side of the first region R1 and the second region R2. Here, light that passes through substantially the center of the incident surface 115 of the first rod integrator 114 and that is perpendicularly incident on the incident surface 115 is perpendicularly emitted from the exit surface 118. Then, by converging the light emitted from the second light source section 122 within this space and causing the converged light to be incident on the second region R2, an optical system can be disposed such that: the first light source section 100 and the second light source section 122 do not interfere with each other; and an optical path of the light emitted from the first light source section 100 and an optical path of the light emitted from the second light source section 122 do not interfere with each other.

In order to obtain high output with an LED, a light-emitting surface area needs to be large. Meanwhile, when a fluorescent material is excited by a laser beam, high output can be obtained while a light-emitting part is reduced in size, by converging the laser beam on a small spot. Thus, as understood from the above equation (1), in the second light source section 122, the etendue can be decreased by converging the laser beam to reduce a light-emitting surface area. In other words, where E1 denotes the etendue of the first light source section 100 and E2 denotes the etendue of the second light source 122, a relationship of E1>E2 is satisfied.

As an incident angle of a light beam incident on the second rod integrator 119 increases, an emission angle of the light beam emitted from the exit surface 121 increases. Thus, as a converging angle of light incident on the incident surface 120 of the second rod integrator 119 increases, a region irradiated by the second rod integrator 119 increases in size. Therefore, when a plurality of light source sections is used, if a converging angle of each light source section is different from those of the others, a region irradiated with light from each light source section does not agree with those from the others, and the center of an illuminated region and the surrounding of the center are different in brightness from each other. For that reason, in the present embodiment, a converging angle θ1 of the first light source section 100 is substantially equalized with a converging angle θ2 of the second light source section 122, whereby the light intensity and the spectral characteristics on the illuminated region can be uniformed.

Where: A1 denotes the size of a light source image formed on the incident surface 120 of the second rod integrator 119 by the light emitted from the first light source section 100; and A2 denotes the size of a light source image formed on the incident surface 120 of the second rod integrator 119 by the light emitted from the second light source section 122, when E1>E2, a relationship of A1>A2 is satisfied due to the relationship of the above equation (1). Thus, in the present embodiment, in order to efficiently introduce both of the light source images into the second rod integrator 119 and to effectively use the lights from the first light source section 100 and the second light source section 122, the surface area S1 of the first region R1 is set so as to be larger than the surface area (S2−S1) of the second region R2. Here, S1 corresponds to the first region R1, S2 corresponds to the area of the incident surface 120 of the second rod integrator 119, and S2−S1 corresponds to the second region R2. As a result, a wasteful space is eliminated from the incident surface 120 of the second rod integrator 119 and the second rod integrator 119 is made compact, while output of light with a high brightness is enabled.

Further, more preferably, as shown in the following equation (2), the surface area S1 of the first region R1 and the surface area (S2−S1) of the second region R2 are substantially proportional to the etendues of the first and second light source sections 100 and 122, respectively. By this, the lights from the first and second light source sections 100 and 122 are more effectively used.

$$S1/E1 \approx (S2-S1)/E2 \qquad (2)$$

Moreover, preferably, the image of the first light source section 100 and the first region R1 are similar in shape to each other, and the image of the second light source section 122 and the second region R2 are similar in shape to each other. By this, the lights from the first light source section 100 and the second light source section 122 can be more efficiently introduced.

Figure 3A:
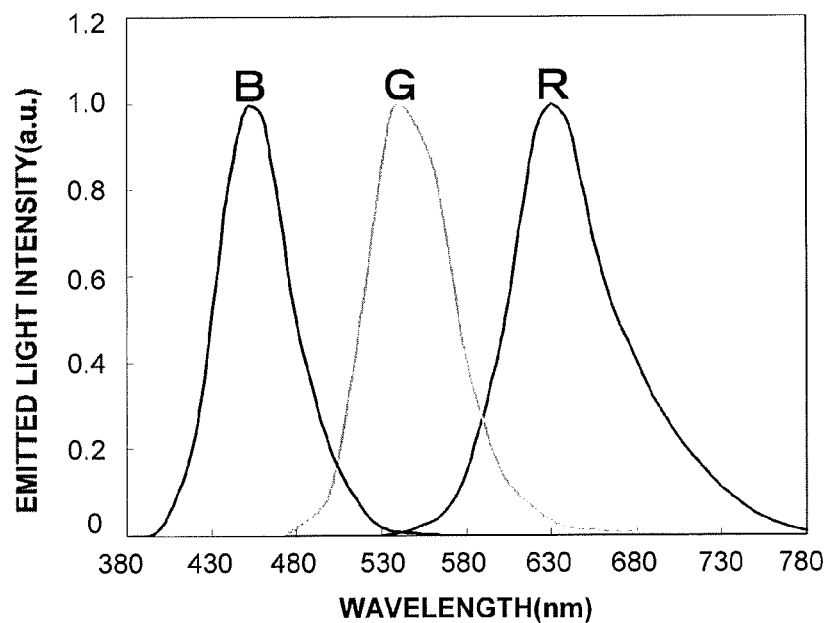
FIG. 3A is a graph diagram showing spectral characteristics of fluorescent light.
Figure 3B:
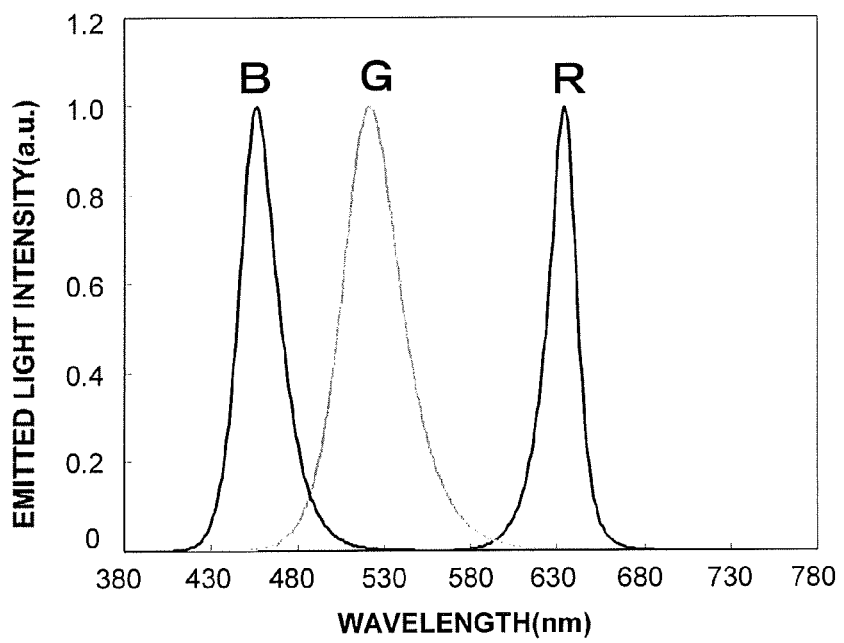
FIG. 3B is a graph diagram showing spectral characteristics of LED light.

FIG. 3A is a graph diagram showing spectral characteristics of fluorescent light, and FIG. 3B is a graph diagram showing spectral characteristics of LED light.

When FIG. 3A and FIG. 3B are compared to each other, the wavelength width of each of red fluorescent light, green fluorescent light, and blue fluorescent light are large as compared to that of LED light, and each fluorescent light has a low color purity. Meanwhile, when LEDs are used as light sources of a lighting device, the light output of a green LED is insufficient, and the light output and the spectral characteristics of a red LED greatly change depending on the junction temperature. In contrast, in the present embodiment, each of the first light source section 100 and the second light source section 122 stabilizes its light output by using red fluorescent light. In addition, in the first light source section 100, the LED is used for green light, thereby compensating for the green fluorescent light in the second light source section 122, which has a low color purity.

Further, a blue laser beam does not have high wavelengths and has a deep color, and thus it has poor visibility. In contrast, in the present embodiment, the blue LED is used in the first light source section 100, thereby reproducing blue color having good visibility.

In the lighting device 1, when high output is required, both the first light source 100 and the second light source 122 are used. However, when the lighting device 1 is used in an energy-saving mode, it is desirable to use only the first light source 100 that has excellent color reproducibility.

In the first embodiment, setting is made so as to satisfy E1>E2. However, when an LED having high output with a small light-emitting part can be used in the first light source section 100, E1>E2 is satisfied, and thus it suffices that the surface area S1 of the first region R1 is set so as to be smaller than the surface area (S2−S1) of the second region R2.

Second Embodiment

Figure 4:
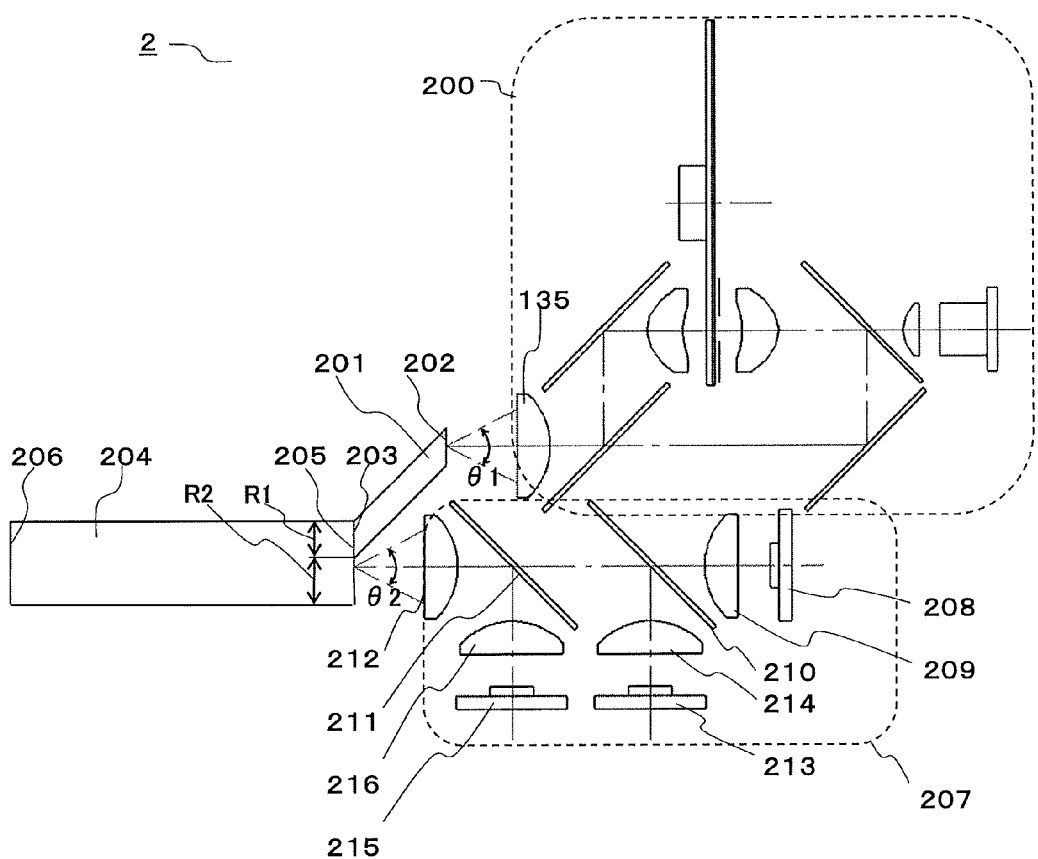
FIG. 4 is a configuration diagram of a lighting device according to a second embodiment.

FIG. 4 is a configuration diagram of a lighting device according to a second embodiment.

The lighting device 2 according to the second embodiment is different from the lighting device 1 according to the first embodiment in the configurations of the light source sections.

A first light source section 200 is the same as the second light source section 122 of the first embodiment, but light converged by the converging lens 135 is converged on an incident surface 202 of a first rod integrator 201.

A second light source section 207 includes an LED 208 emitting green light, an LED 213 emitting blue light, an LED 215 emitting red light, collimator lenses 209, 214, and 216, a blue reflection dichroic mirror 210, a red reflection dichroic mirror 211, and a converging lens 212.

The green light emitted from the LED 208 is converted into substantially parallel light by the collimator lens 209 of which a focal point is located on a light-emitting surface of the LED 208. The green light having been converted into the parallel light passes in order through the blue reflection dichroic mirror 210 and the red reflection dichroic mirror 211, and then is converged on an incident surface 205 of a second rod integrator 204 by the converging lens 212. The blue light emitted from the LED 213 is converted into substantially parallel light by the collimator lens 214 of which a focal point is located on a light-emitting surface of the LED 213. The blue light having been converted into the parallel light is reflected by the blue reflection dichroic mirror 210, and then passes through the red reflection dichroic mirror 211. The passed blue light is converged on the incident surface 205 of the second rod integrator 204 by the converging lens 212. The red light emitted from the LED 215 is converted into substantially parallel light by the collimator lens 216 of which a focal point is located on a light-emitting surface of the LED 215. The red light having been converted into the parallel light is reflected by the red reflection dichroic mirror 211, and then converged on the incident surface 205 of the second rod integrator 204 by the converging lens 212.

Since the first light source section 200 employs the laser element, the etendue E1 of the first light source section 200 is lower than the etendue E2 of the second light source section 207. In addition, a converging angle θ1 of light emitted from the first light source section 200, and a converging angle θ2 of light emitted from the second light source section 207, are set so as to be substantially equal to each other. Thus, in the second embodiment, the surface area S1 of the first region R1 is smaller than the surface area (S2−S1) of the second region R2.

Third Embodiment

Figure 5:
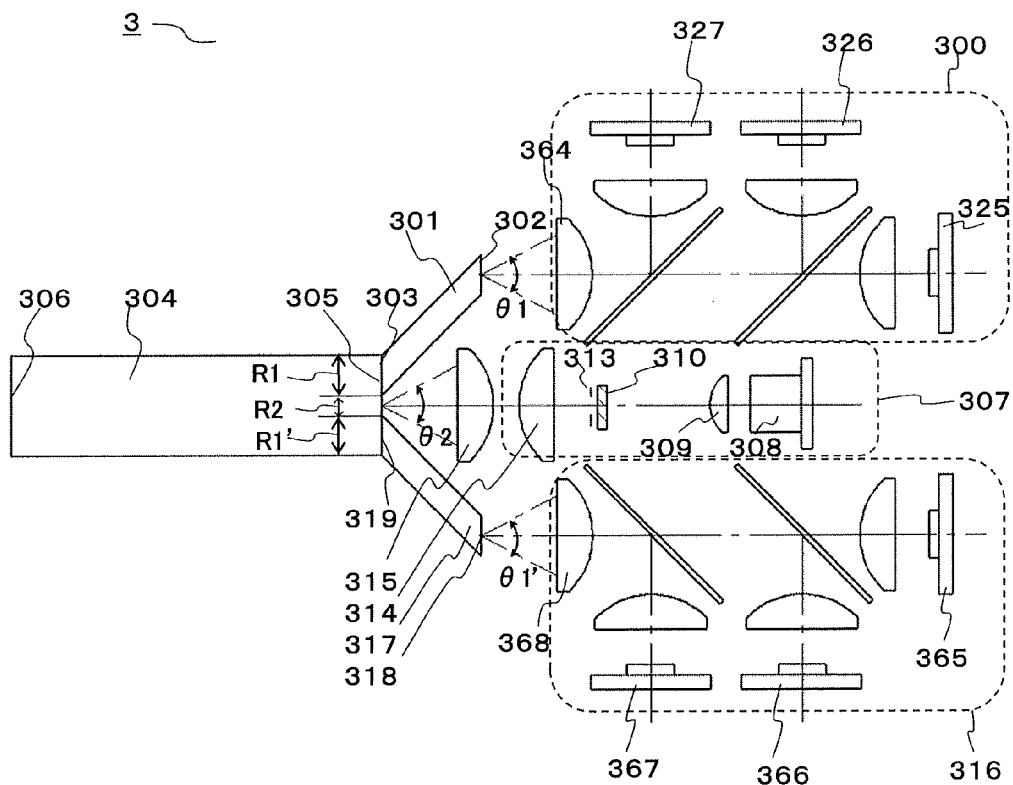
FIG. 5 is a configuration diagram of a lighting device according to a third embodiment.

FIG. 5 is a configuration diagram of a lighting device according to a third embodiment.

The lighting device 3 according to the third embodiment includes a pair of first rod integrators 301 and 317, a second rod integrator 304, a pair of first light source sections 300 and 316, and a second light source section 307.

Each of the first rod integrators 301 and 317 is the same as the first rod integrator 114 of the first embodiment. The first rod integrators 301 and 317 are disposed such that central axes thereof are inclined relative to an incident surface 319 of the second rod integrator 304, and so as to spread apart with increasing distance from the incident surface 319. Thus, a space is formed to the second light source section 307 side of first regions R1 and R1' and a second region R2. By converging light emitted from the second light source section 307 within this space, an optical system can be disposed such that: the first light source section 300, the second light source section 307, and the first light source section 316 do not interfere with each other; and an optical path of light emitted from the first light source section 300, an optical path of the light emitted from the second light source section 307, and an optical path of light emitted from the first light source section 316 do not interfere with each other.

Similarly to the second light source section 207 of the second embodiment, the first light source section 300 includes an LED 325 emitting green light, an LED 326 emitting blue light, and an LED 327 emitting red light. The light of the color emitted from each of the LEDs 325, 326, and 327 is converged on an incident surface 302 of the first rod integrator 301 by a converging lens 364. Similarly to the second light source section 207 of the second embodiment, the first light source section 316 also includes an LED 365 emitting green light, an LED 366 emitting blue light, and an LED 367 emitting red light. The light of the color emitted from each of the LEDs 365, 366, and 367 is converged on the incident surface 318 of the first rod integrator 317 by a converging lens 368.

The second light source section 307 includes a laser element 308 emitting green light, collimator lenses 309 and 314, a diffusion plate 310, an aperture 313, and a converging lens 315.

Figure 6:
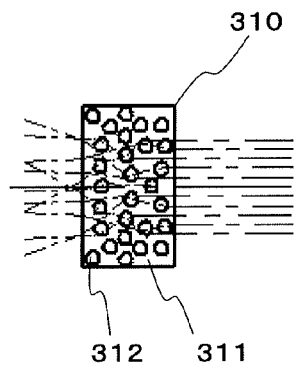
FIG. 6 is a schematic diagram for explaining a diffusion plate of the lighting device shown in FIG. 5.

FIG. 6 is a schematic diagram for explaining the diffusion plate of the lighting device shown in FIG. 5.

The diffusion plate 310 includes a base material 311 and beads 312 that are included in the base material 311 and that have a refractive index different from that of the base material 311.

An optical path of a light beam incident on the diffusion plate 310 (incident toward the left side in the drawing) is differently bent depending on a position where the light beam is incident on the beads 312. As a result, the light incident on the diffusion plate 310 is emitted as diffused light from the diffusion plate 310. Note that returning of the light having entered the diffusion plate 310, to the incident side is suppressed.

Referring back to FIG. 5, the green light emitted from the laser element 308 is converted into very thin parallel light by the collimator lens 309, and enters the diffusion plate 310. The green light having entered the diffusion plate 310 is converted into diffused light and passes through an opening of the aperture 313, and then is converted into parallel light by the collimator lens 314. The green light having been converted into the parallel light is converged on an incident surface 305 of the second rod integrator 304 by the converging lens 315.

In the third embodiment, only the green light from the laser element 308 is emitted from the second light source section 307. Where: E1 denotes the etendue of the first light source section 300; E2 denotes the etendue of the second light source section 307; and E1' denotes the etendue of the first light source section 316, a relationship of E1=E1'>E2 is satisfied. In addition, a converging angle θ1 of light emitted from the first light source section 300, a converging angle θ2 of light emitted from the second light source section 307, and a converging angle θ1' of light emitted from the first light source section 316 are substantially equal to each other. Thus, in the third embodiment, the surface area (S2−S1-S1') of the second region R2 on which the light from the second light source section 307 is incident, is set so as to be smaller than: the surface area S1 of the first region R1 on which the light from the first light source section 300 is incident; and the surface area S1' of the first region R1' on which the light from the first light source section 316 is incident (where S2 denotes the area of the incident surface 305), thereby effectively using the light from each light source section.

Preferably, as shown in the following equation (3), the surface areas S1 and S1' of the first regions R1 and R1' and the surface area (S2−S1−S1') of the second region R2 are substantially proportional to the etendues of the first light source sections 300 and 316 and the second light source section 307, respectively.

$$S1/E1 = S1'/E1' = (S2-S1-S1')/E2 \quad (3)$$

In the third embodiment, in the second light source section 307, the diffusion plate 310 formed from the materials having different refractive indexes is used for diffusing the green light. However, the diffusion plate is not necessarily limited thereto, and, for example, frosted glass may be used as the diffusion plate.

In the third embodiment, for the purpose of compensating for an insufficient amount of light, the laser element 308 of the second light source section 307 emits green light. Thus, when red light is insufficient, a laser element emitting red light may be used, and when blue light is insufficient, a laser element emitting blue light may be used. When lights of multiple colors are insufficient, multiple laser elements corresponding to the insufficient colors may be provided, and lights emitted from the multiple laser elements may be combined by a dichroic mirror.

In the third embodiment, the first light source section 300 and the first light source section 316 have the same configuration. However, the present invention is not particularly limited thereto, and the first light source section 300 and the first light source section 316 may have different configurations such that E1≠E1' (R1≠R1').

Fourth Embodiment

Figure 7:
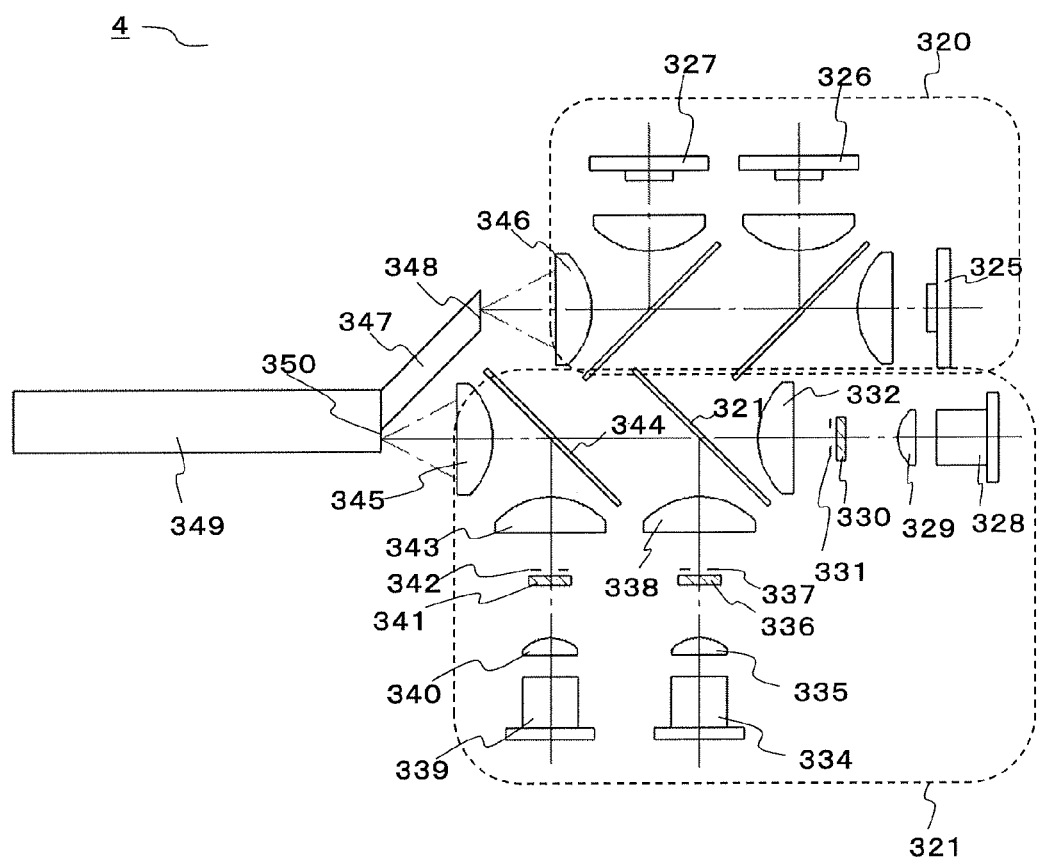
FIG. 7 is a configuration diagram of a lighting device according to a fourth embodiment.

FIG. 7 is a configuration diagram of a lighting device according to a fourth embodiment.

The lighting device 4 according to the fourth embodiment is different from the lighting device 1 according to the first embodiment in the configurations of the light source sections.

Similarly to the second light source section 207 of the second embodiment, a first light source section 320 includes an LED 325 emitting green light, an LED 326 emitting blue light, and an LED 327 emitting red light. The light emitted from each of the LEDs 325, 326, and 327 is converged on an incident surface 348 of a first rod integrator 347 by a converging lens 346.

A second light source section 321 includes a laser element 328 emitting green light, a laser element 334 emitting blue light, a laser element 339 emitting red light, collimator lenses 329, 332, 335, 338, 340, and 343, diffusion plates 330, 336, and 341, apertures 331, 337, and 342, and a converging lens 345.

Fifth Embodiment

Figure 8:
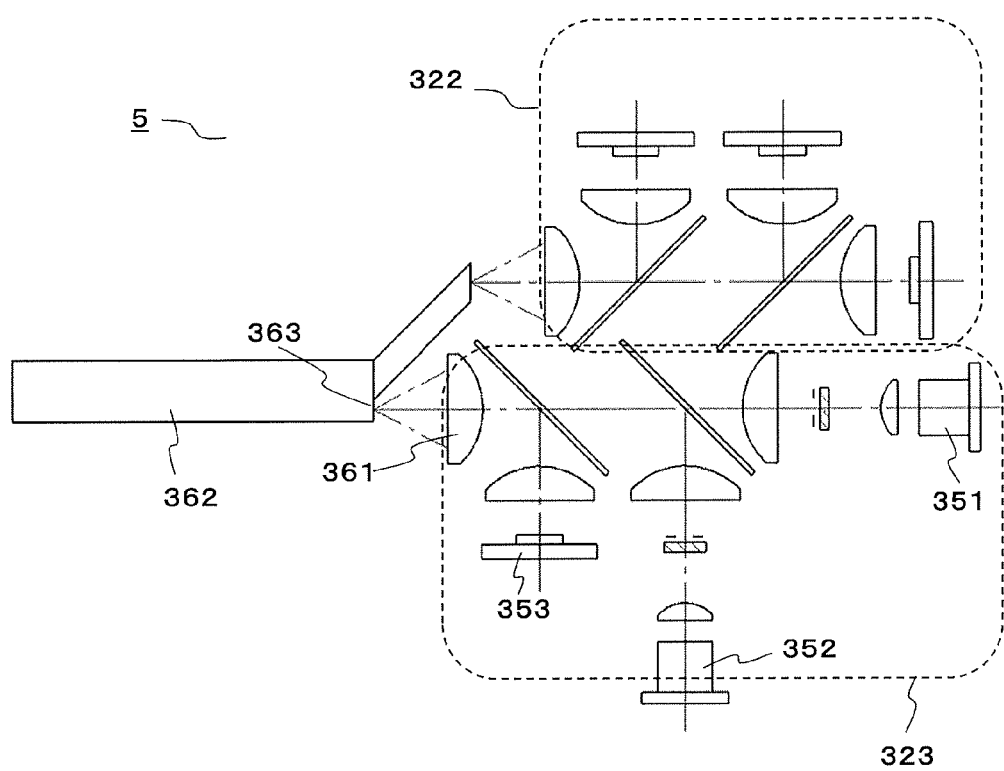
FIG. 8 is a configuration diagram of a lighting device according to a fifth embodiment.

FIG. 8 is a configuration diagram of a lighting device according to a fifth embodiment.

The lighting device 5 according to the fifth embodiment is different from the lighting device 4 according to the fourth embodiment in the configuration of the second light source section.

A second light source section 323 includes a laser element 351 emitting green light, a laser element 352 emitting blue light, and an LED 353 emitting red light. The light emitted from each of the laser elements 351 and 352 and the LED 353 is converged on an incident surface 363 of a second rod integrator 362 by a converging lens 361. In light of uniformity and light use efficiency, it is desirable to set the etendue of the second light source section 323 to an etendue obtained after the lights from the laser elements are diffused.

In the second light source section 323 of the fifth embodiment, only the red light is emitted from the LED, and the green light and the blue light are emitted from the laser elements. However, the present invention is not particularly limited thereto, and green light may be emitted from an LED and blue light and red light may be emitted from laser elements, or blue light may be emitted from an LED and green light and red light may be emitted from laser elements.

Sixth Embodiment

Figure 9:
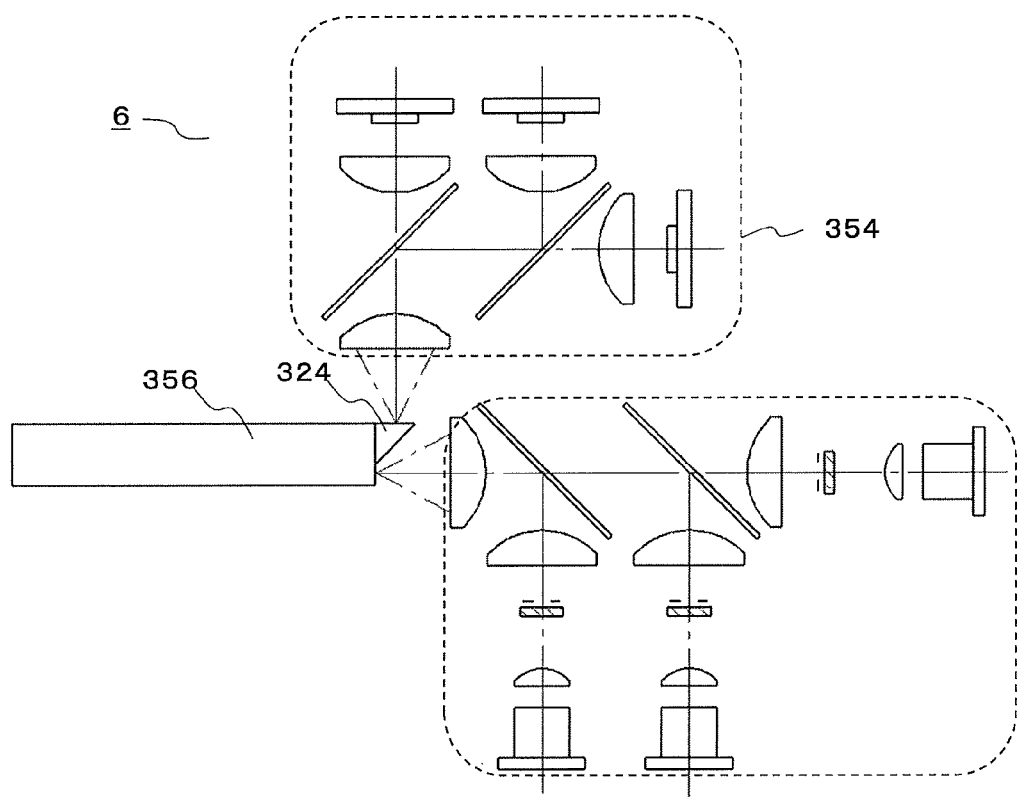
FIG. 9 is a configuration diagram of a lighting device according to a sixth embodiment.

FIG. 9 is a configuration diagram of a lighting device according to a sixth embodiment.

In the lighting device 6, instead of the first rod integrator, a right-angle prism 324 is used as an optical element that guides light from a first light source section 354 to a second rod integrator 356. When three light source sections are provided as in the third embodiment, a pair of right-angle prisms may be used or a first rod integrator and a right-angle prism may be used in combination, instead of the pair of first rod integrators shown in FIG. 5.

What is important in the first to sixth embodiments is that, when lights from a plurality of light source sections, which are guided by the first rod integrator and/or the right-angle prism, are incident on the incident surface of the second rod integrator, the central axes of the incident lights are parallel to each other, the converging angles of the incident lights are substantially equal to each other, and the incident area of each incident light is set to have an optimum size according to each light source section. As a result, even when a plurality of light source sections having etendues different from each other is used, an optical system can be achieved which can obtain a high-brightness and high-quality image.

In the above first to sixth embodiments, a mirror rod type in which four mirrors are formed in a state where a reflection surface faces inward, may be used as the second rod integrator.

Further, in the above first to sixth embodiments, the configurations shown in FIGS. 1, 4, 5, 7, 8, and 9 are used as the configurations of the first light source section and the second light source section, but the present invention is not particularly limited thereto. In the present invention, any combination of: a light source section in which LEDs emit lights of three primary colors, respectively; a light source section in which fluorescent materials emit lights of three primary colors, respectively by being excited by light emitted from a laser element; a light source section in which diffusion sections each diffusing light emitted from a laser element emits lights of three primary colors, respectively; a light source section that includes light sources respectively emitting lights of three primary colors, in combination with an LED and a fluorescent material that emits light by being excited by light emitted from a laser element; a light source section that includes light sources respectively emitting lights of three primary colors, in combination with an LED and a diffusion section that diffuses light emitted from a laser element; a light source section that includes light sources respectively emitting lights of three primary colors, in combination with a fluorescent material that emits light by being excited by light emitted from a laser element and a diffusion section that diffuses light emitted from a laser element, can be used as the first and second light source sections. The surface area of the first region and the surface area of the second region can be set to be optimum according to the etendue of each light source section.

Seventh Embodiment

Figure 10:
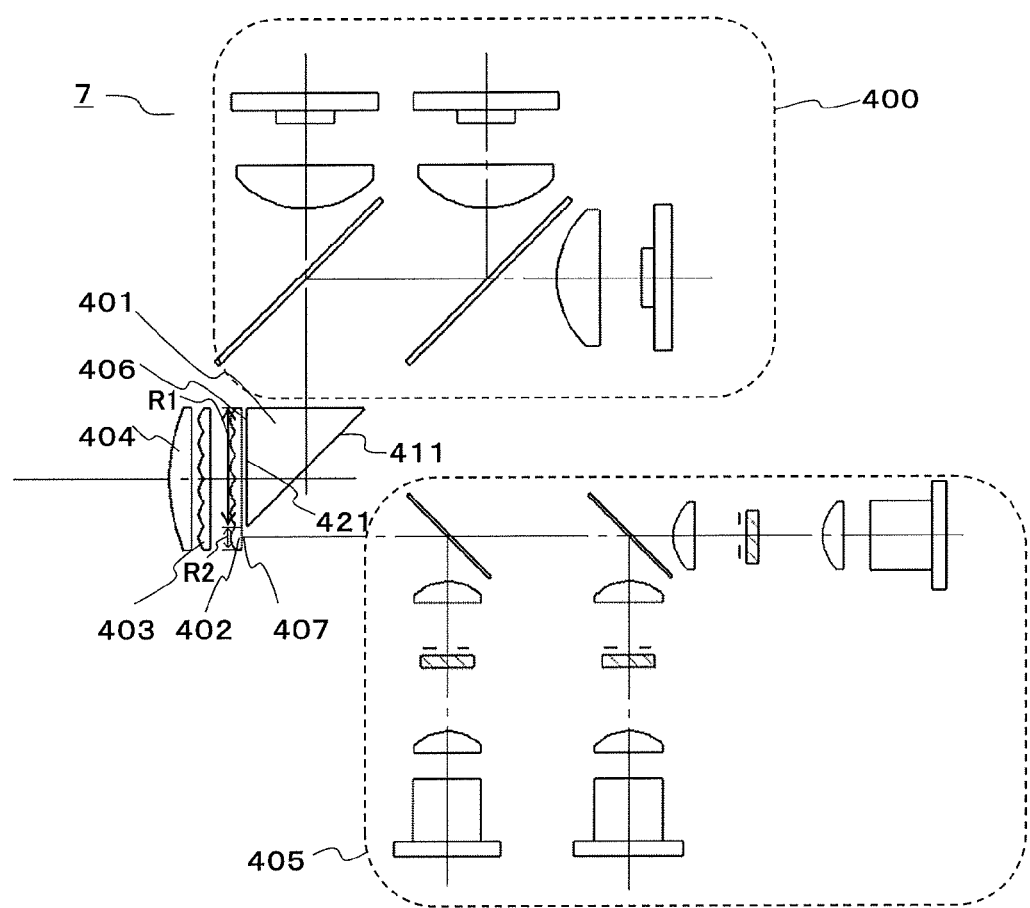
FIG. 10 is a configuration diagram of a lighting device according to a seventh embodiment.

FIG. 10 is a configuration diagram of a lighting device according to a seventh embodiment.

The lighting device 7 includes a first light source section 400, a second light source section 405, a right-angle prism 401, a first multi-lens array integrator 402, a second multi-lens array integrator 403, and a converging lens 404.

In the first multi-lens array integrator 402, a large number of lenses are two-dimensionally arranged. An incident surface 407 of the first multi-lens array integrator 402 is divided into a first region R1 on which light from the first light source section 400 is incident, and a second region R2 on which light from the second light source section 405 is incident.

In the second multi-lens array integrator 403, a large number of lenses are two-dimensionally arranged. Each lens constituting the second multi-lens array integrator 403 corresponds to each lens constituting the first multi-lens array integrator 402 in a one-to-one relation. Each lens constituting the first multi-lens array integrator 402 has a focal point located on the corresponding one of the lenses constituting the second multi-lens array integrator 403. Thus, the light emitted from the first light source section 400 forms, on each lens of the first multi-lens array integrator 402, an image having a shape of the lens, and enters the converging lens 404.

The converging lens 404 coaxially overlaps the image formed on each lens of the first multi-lens array integrator 402. Thus, uniform illumination is achieved.

The right-angle prism 401 guides the light emitted from the first light source section 400, to the first multi-lens array integrator 402. Specifically, the light emitted from the first light source section 400 is bent by the right-angle prism 401, and is perpendicularly incident on the first region R1 on the incident surface 407 of the first multi-lens array integrator 402. Meanwhile, the light from the second light source section 405 is directly incident on the second region R2.

The right-angle prism 401 is disposed to the opposite side of the first multi-lens array integrator 402 with respect to the second multi-lens array integrator 403 (to the light side in the drawing) in a state where an exit surface 421 thereof faces the first region R1. A reflecting surface 411 of the right-angle prism 401 is inclined relative to a plane that includes the boundary between the first region R1 and the second region R2 and that is perpendicular to the incident surface 407 of the first multi-lens array integrator 402. Thus, a space is formed to the second light source section 405 side of the first region R1 and the second region R2. By causing the light emitted from the second light source section 405 to pass within this space, an optical system can be disposed such that: the first light source section 400 and the second light source section 405 do not interfere with each other; and an optical path of the light from the first light source section 400 and an optical path of the light from the second light source section 405 do not interfere with each other.

The first light source section 400 is obtained by omitting the converging lens from the first light source section 300 of the third embodiment, and the second light source section 405 is obtained by omitting the converging lens from the second light source section 321 of the third embodiment. Thus, the repeated description is omitted here.

The etendue E1 of the first light source section 400 is higher than the etendue E2 of the second light source section 405. In addition, the light that is emitted from the first light source section 400 and enters the first multi-lens array integrator 402, and the light that is emitted from the second light source section 405 and enters the first multi-lens array integrator 402, are substantially parallel to each other. Thus, on the basis of the above equation (1), the surface area (indicated by S1) of the first region R1 is set so as to be larger than the surface area (indicated by S2−S1; here, S2 is equal to the area of the exit surface 421 of the right-angle prism 401) of the second region R2.

Eighth Embodiment

Figure 11:
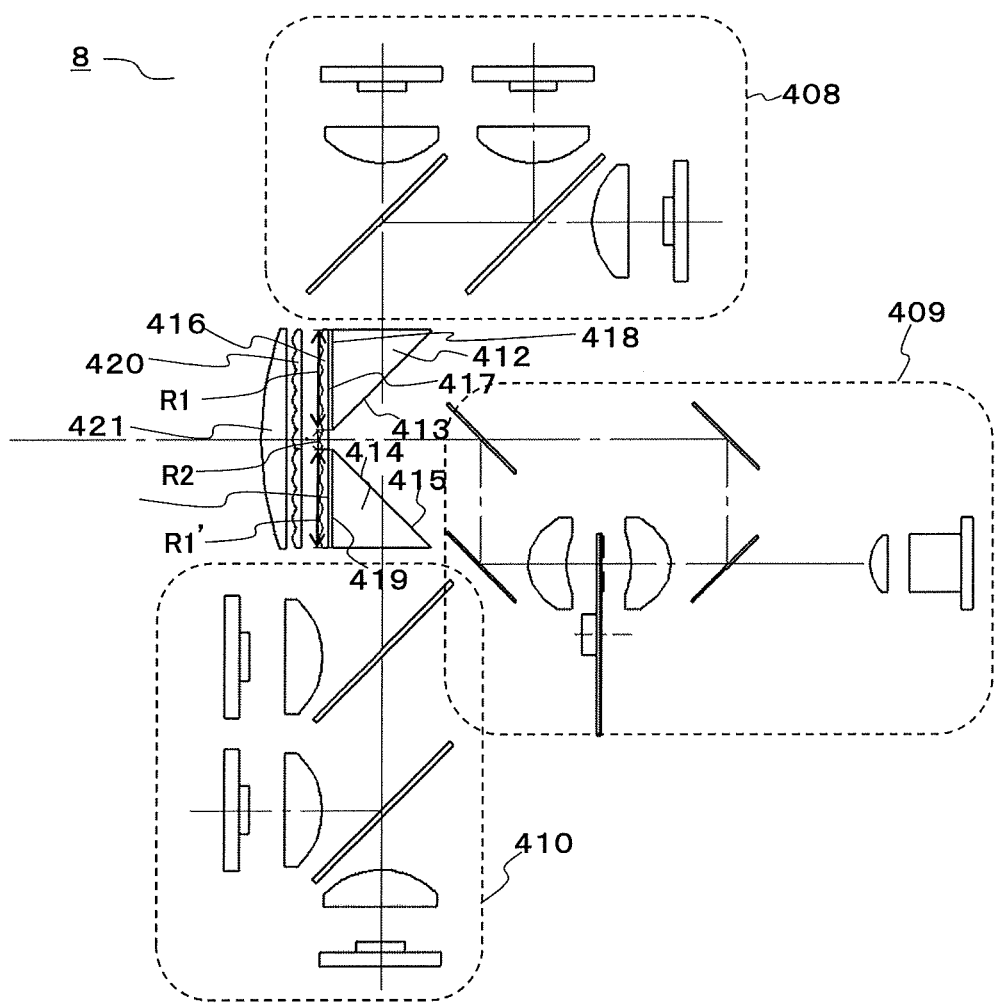
FIG. 11 is a configuration diagram of a lighting device according to an eighth embodiment.

FIG. 11 is a configuration diagram of a lighting device according to an eighth embodiment.

The lighting device 8 according to the eighth embodiment is different from the lighting device 7 according to the seventh embodiment in the number of right-angle prisms and the configurations of the light source sections.

The lighting device 8 includes a pair of right-angle prisms 412 and 414, a pair of first light source sections 408 and 410, a second light source section 409, a first multi-lens array integrator 416, a second multi-lens array integrator 420, and a converging lens 421.

The right-angle prism 412 guides light emitted from the first light source section 408, to a first region R1 on an incident surface 417 of the first multi-lens array integrator 416. The right-angle prism 414 guides light emitted from the first light source section 410, to a first region R1' on the incident surface 417 of the first multi-lens array integrator 416.

The right-angle prisms 412 and 414 are disposed to the opposite side of the first multi-lens array integrator 402 with respect to the second multi-lens array integrator 403 (to the right side in the drawing) in a state where exit surfaces 418 and 419 face the first regions R1 and R1', respectively. A reflecting surface 413 of the right-angle prism 412 is inclined relative to a plane that includes the boundary between the first region R1 and the second region R2 and that is perpendicular to the incident surface 417 of the first multi-lens array integrator 416. Similarly, a reflecting surface 415 of the right-angle prism 414 is inclined relative to a plane that includes the boundary between the first region R1' and the second region R2 and that is perpendicular to the incident surface 417 of the first multi-lens array integrator 416. Further, the reflecting surfaces 413 and 415 spread apart with increasing distance from the incident surface 417. Thus, a space is formed to the second light source section 409 side of the first regions R1 and R1' and the second region R2. By causing light emitted from the second light source section 409 to pass within this space, an optical system can be disposed such that: the first light source section 408, the second light source section 409, and the first light source section 410 do not interfere with each other; and an optical path of the light from the first light source section 408, an optical path of the light from the second light source section 409, and an optical path of the light from the first light source section 410 do not interfere with each other.

The first multi-lens array integrator 416, the second multi-lens array integrator 420, and the converging lens 421 are the same as the first multi-lens array integrator 402, the second multi-lens array integrator 403, and the converging lens 404 of the seventh embodiment. Thus, the repeated description is omitted here.

The first light source sections 408 and 410 have the same configuration as that of the first light source section 400 of the fourth embodiment. In addition, the second light source section 409 has a configuration obtained by omitting the converging lens 135 from the second light source section 122 of the first embodiment. Thus, the repeated description is omitted here.

In the seventh and eighth embodiments, the lights from the light source sections are guided to the first multi-lens array integrator by using the right-angle prism. However, a total reflection mirror plate may be used instead of the right-angle prism.

Further, in the seventh and eighth embodiments, a rod integrator can be used instead of the right-angle prism. However, parallel light, or light having an acute converging angle relative to the incident surface, enters the first multi-lens array integrator. Thus, when the right-angle prism is used, the length of the optical path of the light can be shortened, and hence this advantageously contributes to size reduction and cost reduction of the lighting device.

Ninth Embodiment

Figure 12:
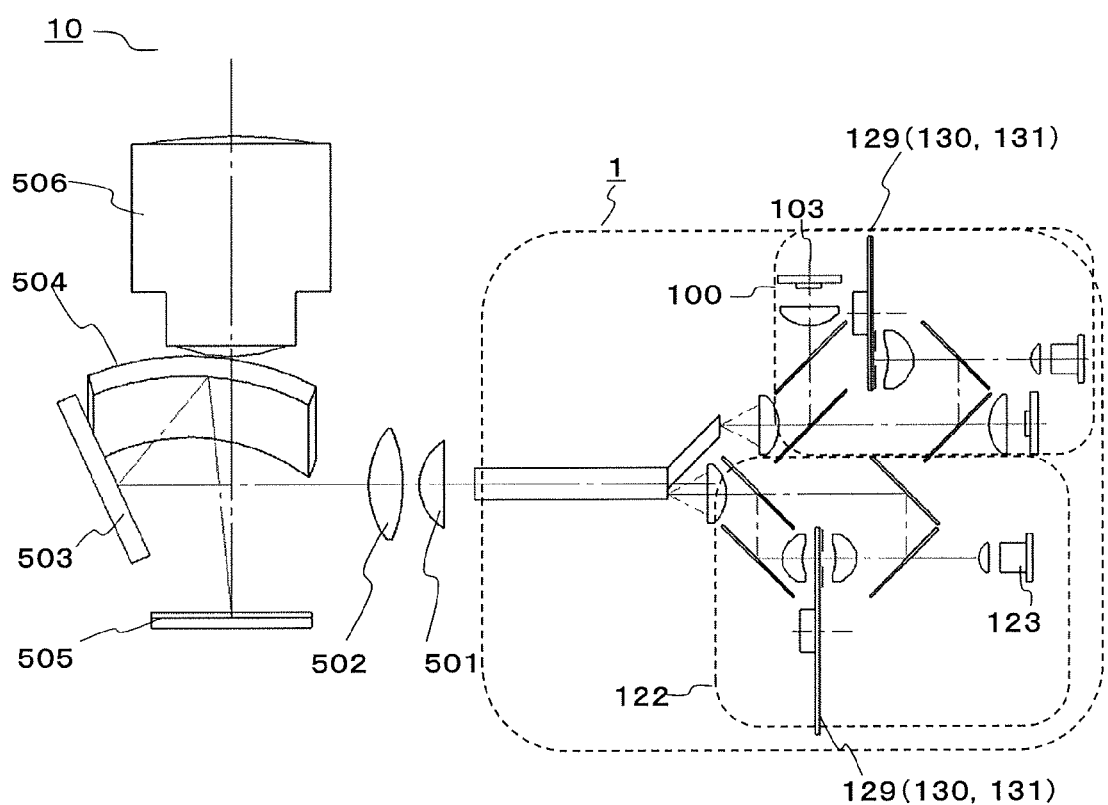
FIG. 12 is a configuration diagram of a projection type image display apparatus according to a ninth embodiment.
Figure 13:
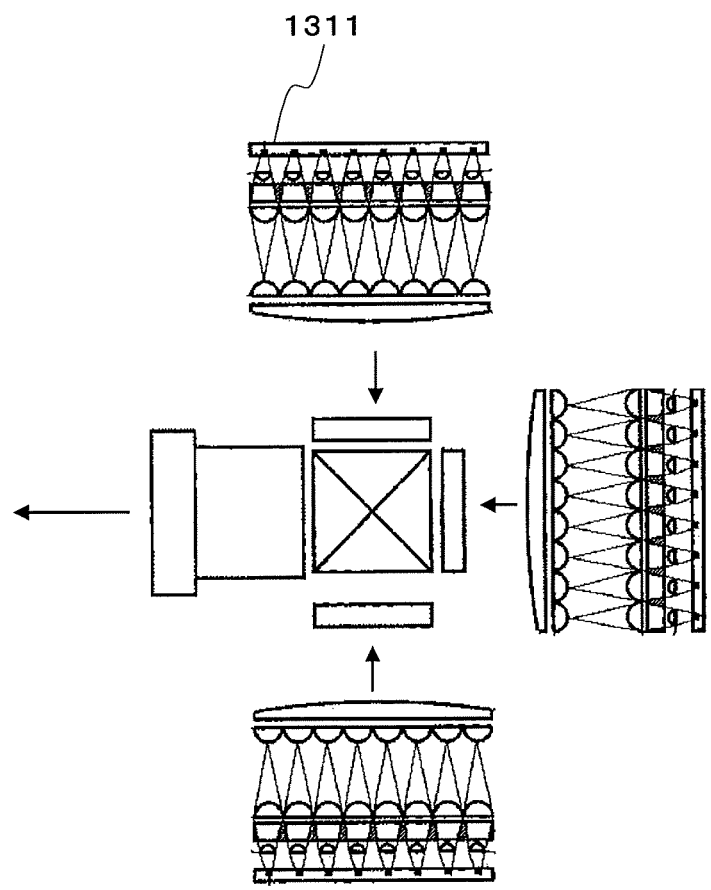
FIG. 13 is a configuration diagram of a lighting device according to a conventional example.
Figure 14:
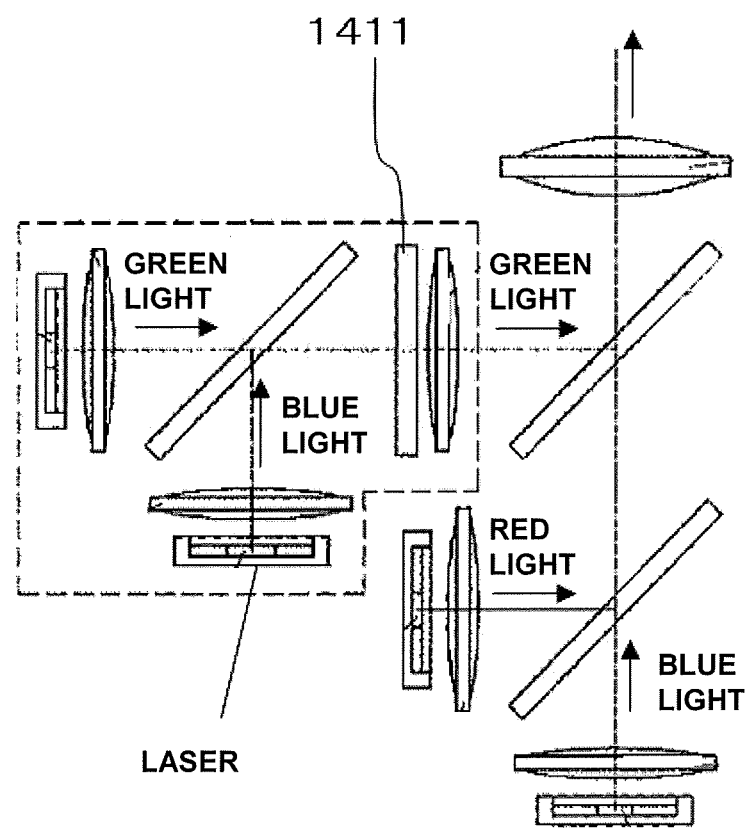
FIG. 14 is a configuration diagram of a lighting device according to a conventional example.

FIG. 12 is a configuration diagram of a projection type image display apparatus according to a ninth embodiment.

The projection type image display apparatus 10 includes the lighting device 1 shown in FIG. 1, relay lenses 501 and 502, a redirecting mirror 503, a curved mirror 504, a digital mirror device (DMD) 505, which is an image display element, and a projection lens 506.

Light emitted from the second rod integrator is incident on the DMD 505 through the relay lenses 501 and 502, the redirecting mirror 503, and the curved mirror 504. In the DMD 505, micro-mirrors are two-dimensionally arranged, and an inclination of each mirror is adjusted in accordance with an external input signal. For example, a mirror located at a position corresponding to a pixel for white display is inclined in a direction that decreases the incident angle of light. Meanwhile, a mirror located at a position corresponding to a pixel for black display is inclined in a direction that increases the incident angle of light. Light reflected by each mirror passes through the projection lens 506, and is projected as an image on a screen (not shown). At this time, the shape of the exit surface of the second rod integrator is transferred on the DMD 505, and thus the light emitted from the second rod integrator can be efficiently and uniformly converged.

Moreover, the DMD 505 performs high-speed drive of the minors by a drive circuit (not shown), for example, in accordance with video signals for red, green, and blue, thereby performing color display. Therefore, when the DMD 505 is driven in accordance with a video signal for red, the lighting device 1 is controlled such that red light is emitted from both the first light source section 100 and the second light source section 122; when the DMD 505 is driven in accordance with a video signal for green, the lighting device 1 is controlled such that green light is emitted from both the first light source section 100 and the second light source section 122; and when the DMD 505 is driven in accordance with a video signal for blue, the lighting device 1 is controlled such that blue light is emitted from both the first light source section 100 and the second light source section 122.

In the ninth embodiment, the DMD is used as an image display element. However, for example, an LCOS (LIQUID CRYSTAL ON SILICON) which quickly switches a drive signal may be used.

Further, in the ninth embodiment, the lighting device using the second rod integrator is used, but the lighting device using the first and second multi-lens array integrators as shown in FIG. 10 may be used.

The present invention is applicable to, for example, a lighting device that is required to have high output of light, and a projection type image display apparatus using the lighting device.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A lighting device comprising:
a first light source section;
a second light source section whose etendue is different from that of the first light source section;
a second rod integrator for combining light emitted from the first light source section and light emitted from the second light source section, the second rod integrator defining a second-rod-integrator incident surface; and
a first rod integrator for guiding onto the second rod integrator the light emitted from the first light source section, the first rod integrator defining a first-rod-integrator exit surface; wherein:
the surface area of the second-rod-integrator incident surface is larger than the first-rod-integrator exit surface,
a first region on which the light emitted from the first light source section is incident and a second region on which the light emitted from the second light source section is incident do not overlap each other, on the second-rod-integrator incident surface,
a converging angle of the light that is emitted from the first light source section and converged on the first-rod-integrator exit surface is substantially equal to a converging angle of the light that is emitted from the second light source section and converged on the second region, and
the surface area of the first region and the surface area of the second region are proportional respectively to the etendue of the first light source section and to the etendue of the second light source section.

2. The lighting device according to claim 1, wherein:
the first rod integrator is a rectangular-columnar optical element with the exit surface being inclined relative to its central axis, longitudinally;
the exit surface of the first rod integrator is in contact with the incident surface of the second rod integrator;
the first rod integrator is disposed such that the central axis is inclined relative to the incident surface of the second rod integrator, thereby forming a space to the second light source section side of the first region and the second region; and
the light emitted from the second light source section converges within the formed space.

3. The lighting device according to claim 1, wherein:
a plurality of pairs of the first light source section and the first rod integrator is provided;
each first rod integrator is a rectangular-columnar optical element with the exit surface inclined relative to its central axis, longitudinally;
the exit surface of each first rod integrator is in contact with the incident surface of the second rod integrator;
the first rod integrators are disposed such that the central axes are inclined relative to the incident surface of the second rod integrator, and so as to spread apart with increasing distance from the incident surface of the second rod integrator, thereby forming a space to the second light source section side of the first region and the second region; and
the light emitted from the second light source section converges within the formed space.

4. The lighting device according to claim 1, wherein:
an image of the first light source section is similar in shape to the first region; and
an image of the second light source section is similar in shape to the second region.

5. The lighting device according to claim 1, wherein the first light source section and the second light source section respectively include light-emitting sections for emitting light having one of three primary colors and having different spectral characteristics.

6. The lighting device according to claim 1, wherein:
each of the first light source section and the second light source section includes:
a laser element; and
a fluorescent material for emitting light by being excited by a laser beam emitted from the laser element.

7. The lighting device according to claim 1, wherein at least the one of the first light source section and the second light source section having the higher etendue, includes an LED.

8. The lighting device according to claim 1, wherein:
the etendue of the first light source section is lower than the etendue of the second light source section;
the first light source section includes a laser element and a fluorescent material for emitting light by being excited by a laser beam emitted from the laser element; and
the second light source section includes an LED.

9. The lighting device according to claim 1, wherein:
the etendue of the first light source section is lower than the etendue of the second light source section;
the first light source section includes a laser element and a diffusion section for diffusing a laser beam emitted from the laser element; and
the second light source section includes an LED.

10. The lighting device according to claim 1, wherein at least one of either the first light source section or the second light source section includes:
a laser element;
a fluorescent material for emitting light by being excited by a laser beam emitted from the laser element; and
an LED.

11. The lighting device according to claim 1, wherein:
one of either the first light source section or the second light source section includes a laser element and a fluorescent material for emitting green light by being excited by a laser beam emitted from the laser element; and
the other of the first light source section and the second light source section includes an LED that emits red light.

12. The lighting device according to claim 1, wherein at least one of either the first light source section or the second light source section includes:
a laser element;
a fluorescent material for emitting red light by being excited by a laser beam emitted from the laser element; and
an LED.

13. A projection type image display apparatus comprising:
a lighting device according to claim 1;
an image display element on which light emitted from the lighting device is incident and that modulates the incident light in accordance with a video signal; and
a projection lens for projecting onto a screen the light modulated by the image display element.

* * * * *